United States Patent
Na et al.

(10) Patent No.: US 12,138,832 B2
(45) Date of Patent: Nov. 12, 2024

(54) STACK MOLDING MACHINE

(71) Applicant: ITM SEMICONDUCTOR CO., LTD., Cheongju-si (KR)

(72) Inventors: Hyuk Hwi Na, Cheongju-si (KR); Ho Seok Hwang, Gunpo-si (KR); Sang Hoon Ahn, Cheongju-si (KR); Jae Ku Park, Cheongju-si (KR); Eun Bin Lee, Cheongju-si (KR); Sang Dae Kim, Cheongju-si (KR); Dong Jin Jang, Incheon (KR)

(73) Assignee: ITM SEMICONDUCTOR CO., LTD., Cheongju-si (KR)

( * ) Notice: Subject to any disclaimer, the term of this patent is extended or adjusted under 35 U.S.C. 154(b) by 249 days.

(21) Appl. No.: 17/729,370

(22) Filed: Apr. 26, 2022

(65) Prior Publication Data

US 2022/0396016 A1     Dec. 15, 2022

(30) Foreign Application Priority Data

Jun. 10, 2021   (KR) .......................... 10-2021-0075466

(51) Int. Cl.
   *B29C 45/12*    (2006.01)
   *B29C 33/00*    (2006.01)
   (Continued)

(52) U.S. Cl.
   CPC ........ *B29C 45/125* (2013.01); *B29C 33/0088* (2013.01); *B29C 45/14655* (2013.01); *B29C 45/322* (2013.01)

(58) Field of Classification Search
   CPC .. B29C 33/0088; B29C 45/125; B29C 45/322
   See application file for complete search history.

(56) References Cited

U.S. PATENT DOCUMENTS

| 6,117,382 A | 9/2000 | Thummel |
| 7,622,067 B2 | 11/2009 | Shinma |
| (Continued) |

FOREIGN PATENT DOCUMENTS

| JP | 03-050841 A | 3/1991 |
| JP | 2669886 B2 | 10/1997 |
| (Continued) |

OTHER PUBLICATIONS

Korean Intellectual Property Office, "Request for the Submission of an Opinion" issued for Korean priority Application No. 10-2021-0075466 on Sep. 20, 2023.

*Primary Examiner* — John J DeRusso
(74) *Attorney, Agent, or Firm* — Bridgeway IP Law Group, PLLC; Sang Ho Lee; Hyun Woo Shin

(57) ABSTRACT

Provided is a stack molding machine including an upper mold having formed therein a first runner and a first gate serving as a path of a resin material, a first intermediate plate provided under and combined with the upper mold, and having formed therein a first molding connected to the first gate to mold at least a portion on a first substrate placed under the first intermediate plate, a dummy plate provided under and spaced a certain distance apart from the first intermediate plate, a second intermediate plate provided under the dummy plate, and having formed therein a second molding connected to a second gate to mold at least a portion under a second substrate placed under the dummy plate, and a lower mold having formed therein a second runner and the second gate serving as a path of the resin material, and combined with the second intermediate plate.

7 Claims, 15 Drawing Sheets

(51) Int. Cl.
*B29C 45/14* (2006.01)
*B29C 45/32* (2006.01)

(56) References Cited

U.S. PATENT DOCUMENTS

| | | | |
|---|---|---|---|
| 10,131,080 B2 | 11/2018 | Koga | |
| 2004/0105909 A1 | 6/2004 | Tofukuji et al. | |
| 2007/0281077 A1 | 12/2007 | Hock | |
| 2008/0230950 A1 | 9/2008 | Nishimura et al. | |
| 2016/0052182 A1 * | 2/2016 | Koga | B29C 45/322 |
| | | | 264/257 |

FOREIGN PATENT DOCUMENTS

| | | | |
|---|---|---|---|
| JP | 2004-193582 A | 7/2004 | |
| JP | 2008-235489 A | 10/2008 | |
| KR | 100421399 B1 * | 3/2004 | |
| KR | 10-2015-0135273 A | 12/2015 | |
| WO | 2006-129343 A1 | 12/2006 | |
| WO | WO-2008041431 A1 * | 4/2008 | B29C 45/02 |

* cited by examiner

STACK MOLDING MACHINE

CROSS-REFERENCE TO RELATED PATENT APPLICATION

This application claims the benefit of Korean Patent Application No. 10-2021-0075466, filed on Jun. 10, 2021, in the Korean Intellectual Property Office, the disclosure of which is incorporated herein in its entirety by reference.

BACKGROUND

1. Field

The present invention relates to a stack molding machine and, more particularly, to a multilayer stack molding machine.

2. Description of the Related Art

In general, to encapsulate semiconductor products such as chips, electronic parts in which packages to be molded are mounted on a carrier such as a lead frame or a ball grid array (BGA) may be molded using epoxy resin.

The molding process refers to an encapsulation process for protecting semiconductor chips mounted on a circuit-patterned substrate, and electrical connections therebetween, from an external physical or chemical environment, and is one of semiconductor manufacturing processes.

A general mold forms a resin molding by injecting a resin material while a substrate on which electronic parts are already mounted is seated between an upper mold and a lower mold, and further includes an intermediate plate having formed therein a runner and a gate serving as a path through which the resin material is injected. According to the above-described configuration, the substrate is seated on an upper surface of the lower mold, the intermediate plate is seated on an upper surface of the substrate, and then the resin material is injected to form the resin molding while the upper mold is pressing the substrate and the intermediate plate.

SUMMARY

However, the above-described general mold structure may have low productivity because the substrate is provided in a single layer between the upper and lower molds, and cause damage of the molding when the molding is demolded.

The present invention provides a stack molding machine capable of molding a plurality of substrates through a single molding process by stacking the substrates on one another, or of controlling molding per layer by using a plurality of injection ports. However, the scope of the present invention is not limited thereto.

According to an aspect of the present invention, there is provided a stack molding machine including an upper mold having formed therein a first runner and a first gate serving as a path of a resin material, a first intermediate plate provided under and combined with the upper mold, and having formed therein a first molding connected to the first gate to mold at least a portion on a first substrate placed under the first intermediate plate, a dummy plate provided under and spaced a certain distance apart from the first intermediate plate, a second intermediate plate provided under the dummy plate, and having formed therein a second molding connected to a second gate to mold at least a portion under a second substrate placed under the dummy plate, and a lower mold having formed therein a second runner and the second gate serving as a path of the resin material, and combined with the second intermediate plate.

The stack molding machine may further include an injection mold provided between the upper and lower molds, and having formed therein an injection port connected to the first and second runners to inject the resin material into the first and second moldings.

The injection mold may include a first connector connected to the first runner to inject the resin material into the first molding, and a second connector connected to the second runner to inject the resin material into the second molding.

The first runner and the first gate formed in the upper mold may be symmetrical to the second runner and the second gate formed in the lower mold, and the first molding formed in the first intermediate plate may be symmetrical to the second molding formed in the second intermediate plate.

According to another aspect of the present invention, there is provided a stack molding machine including an upper mold having formed therein a first runner serving as a path of a resin material, a first intermediate plate provided under and combined with the upper mold, and having formed therein a first molding connected to the first runner to mold at least a portion on a first substrate placed under the first intermediate plate, a first injection plate provided under the first intermediate plate, and having formed therein a third runner serving as a path of the resin material, a second intermediate plate provided under the first injection plate, and having formed therein a second molding connected to the third runner to mold at least a portion on a second substrate placed under the second intermediate plate, a second injection plate provided under the second intermediate plate, and having formed therein a fourth runner serving as a path of the resin material, a third intermediate plate provided under the second injection plate, and having formed therein a third molding connected to the fourth runner to mold at least a portion on a third substrate placed under the third intermediate plate, and a lower mold provided under and combined with the third intermediate plate.

The stack molding machine may further include an injection mold provided between the upper and lower molds, and having formed therein an injection port including a first port to inject the resin material into the first, second, and third moldings, and the injection mold may include a first connector for connecting the first port to the first runner to inject the resin material into the first molding, a third connector for connecting the first port to the third runner to inject the resin material into the second molding, and a fourth connector for connecting the first port to the fourth runner to inject the resin material into the third molding.

The stack molding machine may further include an injection mold provided between the upper and lower molds, and having formed therein an injection port including a second port, a third port, and a fourth port to inject the resin material into the first, second, and third moldings, respectively, and the injection mold may include a first connector for connecting the second port to the first runner to inject the resin material into the first molding, a third connector for connecting the third port to the third runner to inject the resin material into the second molding, and a fourth connector for connecting the fourth port to the fourth runner to inject the resin material into the third molding.

The stack molding machine may further include an injection mold provided between the upper and lower molds, and having formed therein an injection port including a fifth port, a sixth port, and a seventh port to inject the resin material into a plurality of first moldings, a plurality of second moldings, and a plurality of third moldings, respectively, and the injection mold may include a fifth connector for connecting the fifth port commonly to one of a plurality of first runners, one of a plurality of third runners, and one of a plurality of fourth runners, a sixth connector for connecting the sixth port commonly to another of the plurality of first runners, another of the plurality of third runners, and another of the plurality of fourth runners, and a seventh connector for connecting the seventh port commonly to still another of the plurality of first runners, still another of the plurality of third runners, and still another of the plurality of fourth runners.

The upper mold may include a first gate connected to the first molding at an end of the first runner, the first injection plate may include a third gate connected to the second molding at an end of the third runner, and the second injection plate may include a fourth gate connected to the third molding at an end of the fourth runner.

Lowermost portions of the first, third, and fourth gates may have heights equal to those of uppermost portions of the first, second, and third moldings, respectively, in such a manner that residues caused after the first, third, and fourth gates are removed from the first, second, and third moldings remain on the uppermost portions of the first, second, and third moldings, respectively.

Lowermost portions of the first, third, and fourth gates may have heights less than those of uppermost portions of the first, second, and third moldings, respectively, in such a manner that residues caused after the first, third, and fourth gates are removed from the first, second, and third moldings remain below the uppermost portions of the first, second, and third moldings, respectively.

The first intermediate plate may include a first gate for connecting the first runner formed in the upper mold, to the first molding, the second intermediate plate may include a third gate for connecting the third runner formed in the first injection plate, to the second molding, and the third intermediate plate may include a fourth gate for connecting the fourth runner formed in the second injection plate, to the third molding.

The first, third, and fourth gates may have a trapezoidal shape, an inverted trapezoidal shape, or a rectangular shape.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
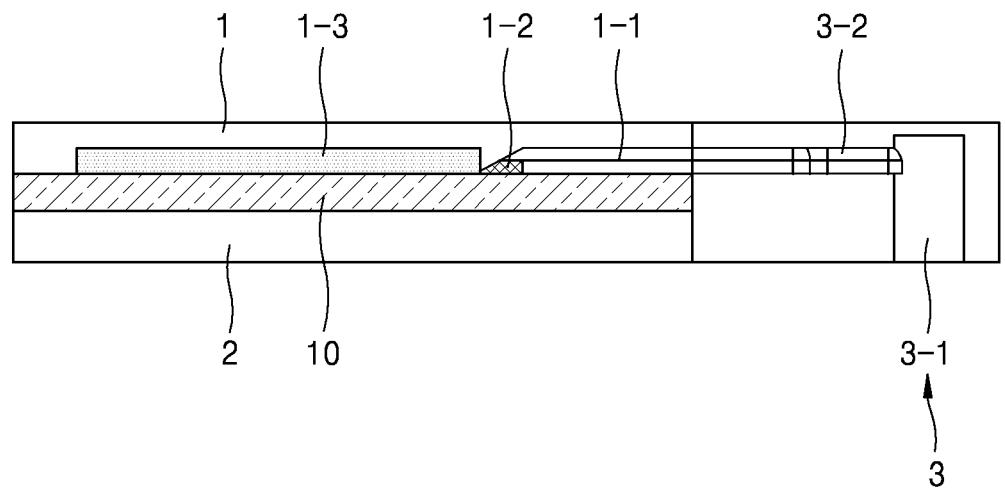
FIG. 1 is a cross-sectional view of a general molding machine related to the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

As illustrated in FIG. 1, a general molding machine includes a mold including an upper mold 1 and a lower mold 2. As such, in a molding process using the mold, a substrate 10 on which a plurality of semiconductor chips are mounted is placed on the lower mold 2 in such a manner that each target region on the substrate 10 is aligned within a molding 1-3 of the upper mold 1, and then the upper mold 1 is lowered to meet the lower mold 2.

Thereafter, heated and melted resin is supplied through a connector 3-2 of the upper mold 1, the lower mold 2, or a separate injection mold 3 and through a runner 1-1 and a gate 1-2 to the molding 1-3. However, according to the general molding machine, the runner 1-1 and the gate 1-2 are formed in the upper or lower mold 1 or 2, and the substrate 10 is provided between the upper and lower molds 1 and 2 in a single layer to mold one layer through one port, thereby causing low productivity.

Figure 2:
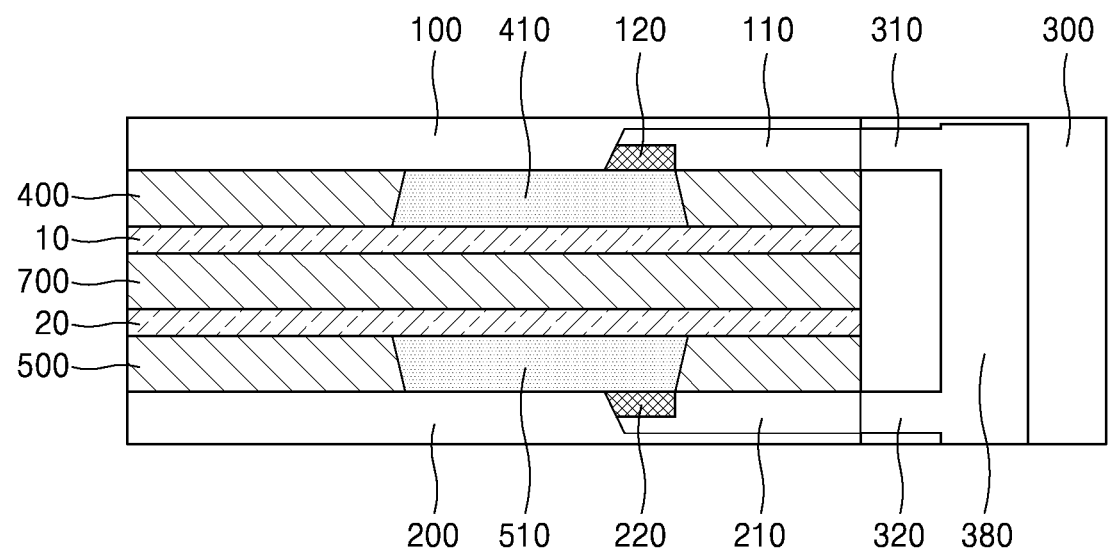
FIG. 2 is a cross-sectional view of a stack molding machine according to an embodiment of the present invention.

FIG. 2 is a cross-sectional view of a stack molding machine according to an embodiment of the present invention.

Initially, the stack molding machine according to an embodiment of the present invention may mainly include an upper mold 100, a lower mold 200, a first intermediate plate 400, a second intermediate plate 500, and a dummy plate 700.

As illustrated in FIG. 2, the upper mold 100 may have formed therein a first runner 110 and a first gate 120 serving as a path of a resin material, and the lower mold 200 may have formed therein a second runner 210 and a second gate 220 serving as a path of the resin material.

In this case, the first runner 110 and the first gate 120 formed in the upper mold 100 may be symmetrical to the second runner 210 and the second gate 220 formed in the lower mold 200. That is, a first substrate 10 under the upper mold 100 and a second substrate 20 on the lower mold 200 may be molded in the same shape to produce a large number of identical products in a single operation, and thus productivity may be increased.

The upper or lower mold 100 or 200 may have formed therein an injection port 380 connected to the first and second runners 110 and 210 to inject the resin material into a first molding 410 and a second molding 510.

The injection port 380 may be formed in an injection mold 300 coupled as a part of the upper and lower molds 100 and 200.

The injection mold 300 may be provided between the upper and lower molds 100 and 200, and include a first connector 310 connected to the first runner 110 to inject the resin material into the first molding 410, and a second connector 320 connected to the second runner 210 to inject the resin material into the second molding 510.

Specifically, the resin material injected into the injection port 380 may flow through the first connector 310 into the first runner 110 and flow through the second connector 320 into the second runner 210, and be molded in the first molding 410 on the first substrate 10 and molded in the second molding 510 under the second substrate 20.

Although not shown in the drawings, the injection port 380 may be provided in a plural number based on the number of substrates, and each injection port may inject the resin material onto each substrate or onto each region on the substrates.

As illustrated in FIG. 2, the first intermediate plate 400 may be provided under the upper mold 100, have the first substrate 10 mounted thereunder, and have formed therein the first molding 410 connected to the first gate 120 to mold a portion on the first substrate 10.

Specifically, the first intermediate plate 400 may be provided under the upper mold 100, and the first substrate 10 may be mounted under the first intermediate plate 400.

That is, the first substrate 10, the first intermediate plate 400, and the upper mold 100 may be sequentially stacked on one another such that the resin material may flow through the first runner 110 into the upper mold 100, pass through the first gate 120, and flow into the first molding 410 formed in the first intermediate plate 400, to mold at least a portion on the first substrate 10.

The second intermediate plate 500 may be provided on the lower mold 200, have the second substrate 20 mounted thereon, and have formed therein the second molding 510 connected to the second gate 220 to mold a portion under the second substrate 20.

Specifically, the second intermediate plate 500 may be provided on the lower mold 200, and the second substrate 20 may be mounted on the second intermediate plate 500.

That is, the lower mold 200, the second intermediate plate 500, and the second substrate 20 may be sequentially stacked on one another such that the resin material may flow through the second runner 210 into the lower mold 200, pass through the second gate 220, and flow into the second molding 510 formed in the second intermediate plate 500, to mold at least a portion under the second substrate 20.

The portion under the second substrate 20 may be flipped to be a portion on the second substrate 20.

The first molding 410 formed in the first intermediate plate 400 may be symmetrical to the second molding 510 formed in the second intermediate plate 500, and thicknesses of the first and second moldings 410 and 510 are determined by the thicknesses of the first and second intermediate plates 400 and 500, respectively.

The dummy plate 700 may be provided between the first and second intermediate plates 400 and 500 to support and protect the first and second substrates 10 and 20 to be spaced apart from each other.

The dummy plate 700 may be added or removed depending on substrate rigidity.

More specifically, as illustrated in FIG. 2, the lower mold 200, the second intermediate plate 500, the second substrate 20, the dummy plate 700, the first substrate 10, the first intermediate plate 400, and the upper mold 100 may be sequentially stacked on one another such that the resin material may be injected from the injection mold 300 to mold at least portions of the first and second substrates 10 and 20.

Figure 3:
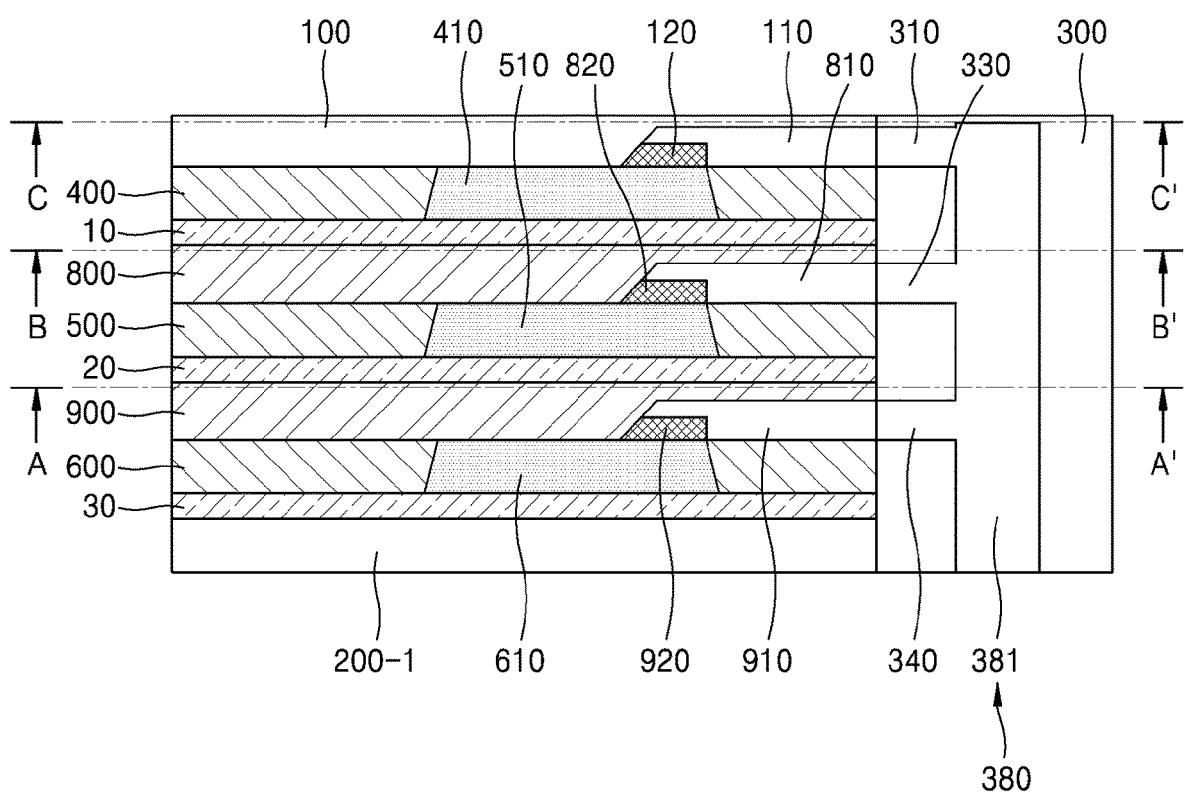
FIG. 3 is a cross-sectional view of a stack molding machine according to another embodiment of the present invention.
Figure 4:
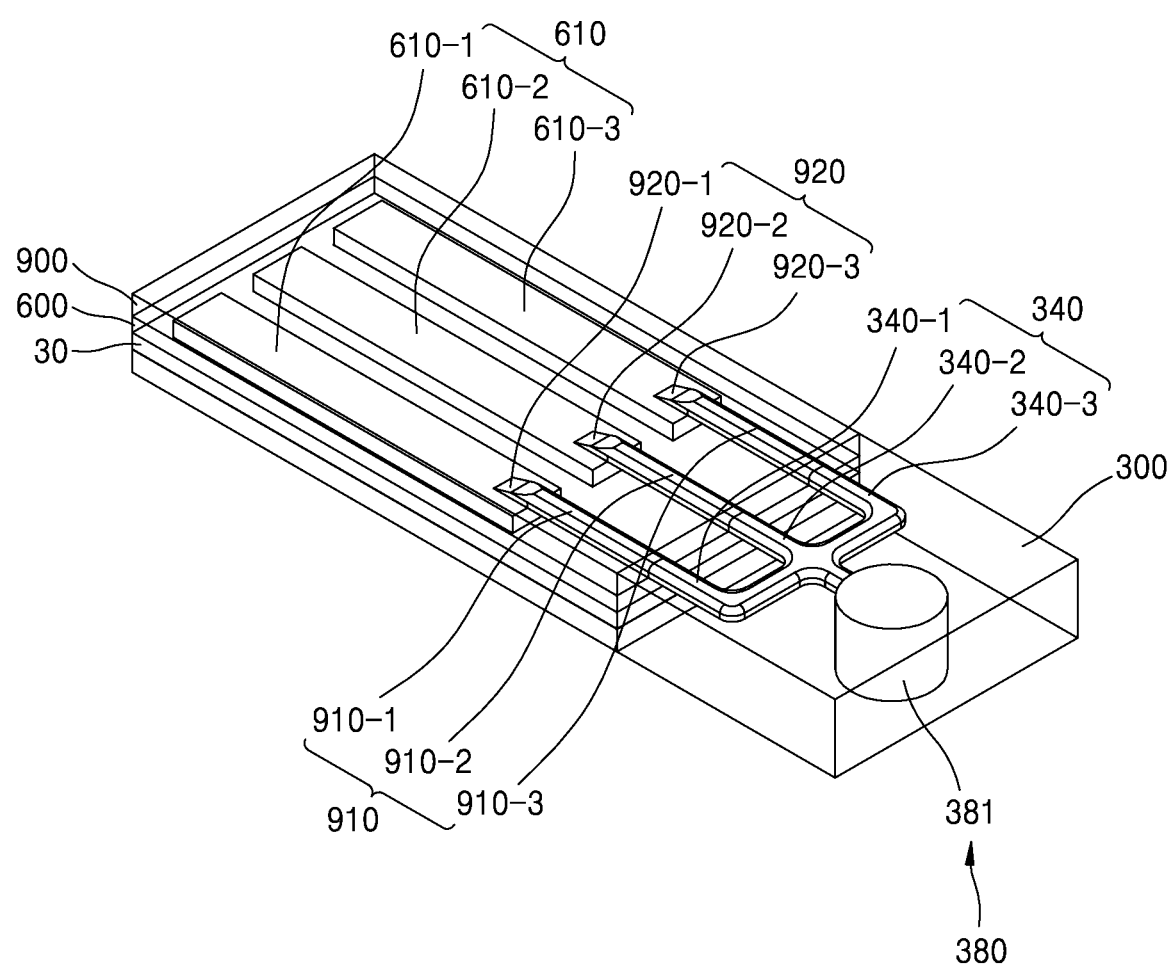
FIG. 4 is a perspective view showing an A-A' cross-section of FIG. 3.
Figure 5:
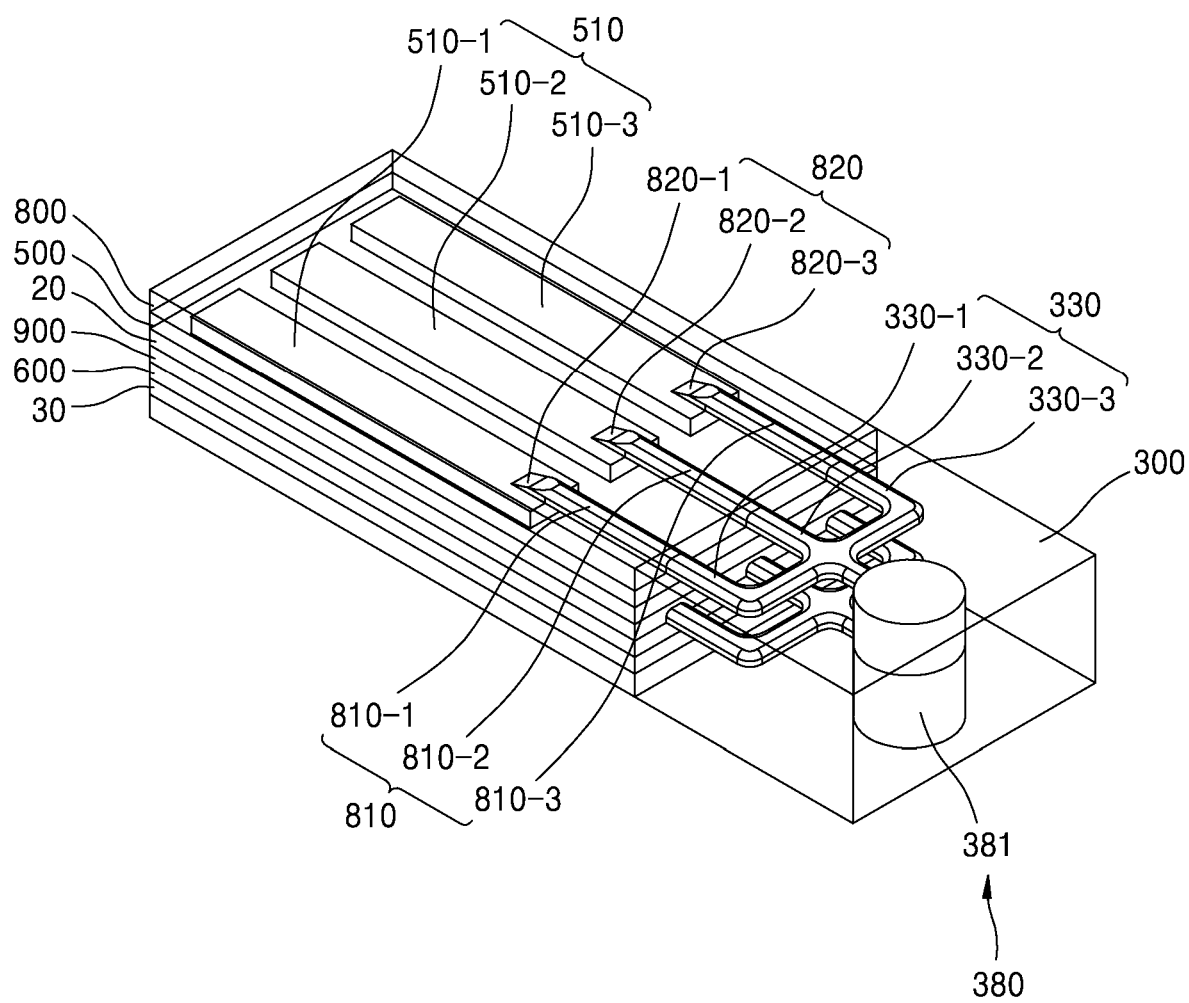
FIG. 5 is a perspective view showing a B-B' cross-section of FIG. 3.
Figure 6:
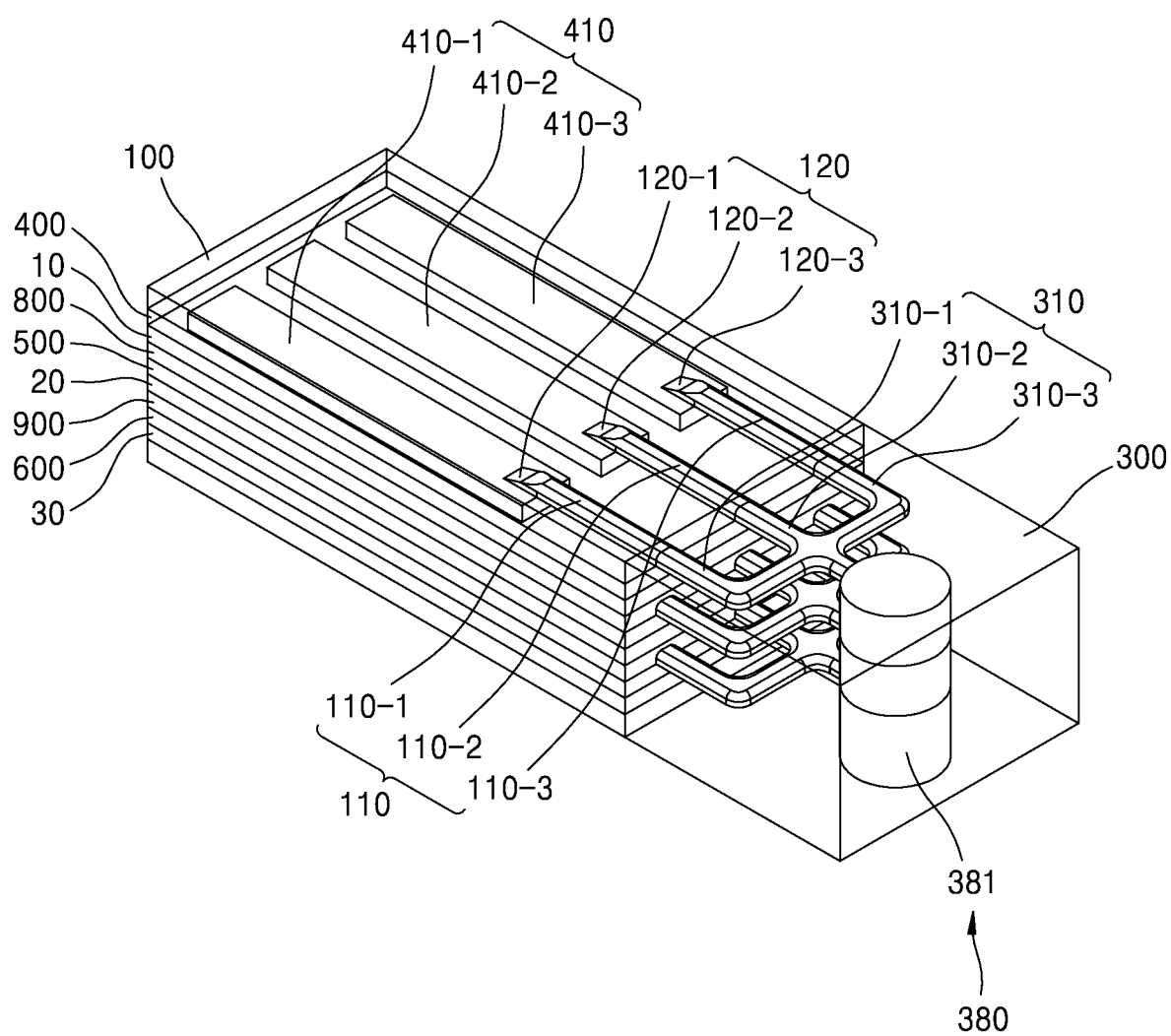
FIG. 6 is a perspective view showing a C-C' cross-section of FIG. 3.

FIG. 3 is a cross-sectional view of a stack molding machine according to another embodiment of the present invention, and FIGS. 4, 5, and 6 are perspective views showing A-A', B-B', and C-C' cross-sections of FIG. 3.

The stack molding machine according to another embodiment of the present invention may include the upper mold 100, a lower mold 200-1, the first intermediate plate 400, the second intermediate plate 500, a third intermediate plate 600, a first injection plate 800, and a second injection plate 900.

As illustrated in FIG. 3, the upper mold 100 may have formed therein the first runner 110 and the first gate 120 serving as a path of a resin material, and the lower mold 200-1 may be combined with the upper mold 100 while supporting the first, second, and third intermediate plates 400, 500, and 600, the first and second injection plates 800 and 900, the first substrate 10, the second substrate 20, and a third substrate 30.

The second injection plate 900 may have formed therein a fourth runner 910 and a fourth gate 920 serving as a path of the resin material, and the third intermediate plate 600 may be provided under the second injection plate 900 and have formed therein a third molding 610 connected to the fourth runner 910.

Specifically, the third substrate 30 may be mounted on the lower mold 200-1, the third intermediate plate 600 may be provided on the third substrate 30, and the second injection plate 900 may be mounted on the third intermediate plate 600.

That is, the lower mold 200-1, the third substrate 30, the third intermediate plate 600, and the second injection plate 900 may be sequentially stacked on one another such that the resin material may flow through the fourth runner 910 into the second injection plate 900, pass through the fourth gate 920, and flow into the third molding 610 formed in the third intermediate plate 600, to mold at least a portion on the third substrate 30.

The first injection plate 800 may have formed therein a third runner 810 and a third gate 820 serving as a path of the resin material, and the second intermediate plate 500 may be provided under the first injection plate 800 and have formed therein the second molding 510 connected to the third runner 810.

Specifically, the second substrate 20 may be mounted on the second injection plate 900, the second intermediate plate 500 may be provided on the second substrate 20, and the first injection plate 800 may be mounted on the second intermediate plate 500.

That is, the second substrate 20, the second intermediate plate 500, and the first injection plate 800 may be sequentially stacked on the second injection plate 900 such that the resin material may flow through the third runner 810 into the first injection plate 800, pass through the third gate 820, and flow into the second molding 510 formed in the second intermediate plate 500, to mold at least a portion on the second substrate 20.

The first intermediate plate 400 may be provided under the upper mold 100 and have formed therein the first molding 410 connected to the first runner 110, and the upper mold 100 may have formed therein the first runner 110 and the first gate 120 serving as a path of the resin material.

Specifically, the first substrate 10 may be mounted on the first injection plate 800, the first intermediate plate 400 may be provided on the first substrate 10, and the upper mold 100 may be mounted on the first intermediate plate 400.

That is, the first substrate 10, the first intermediate plate 400, and the upper mold 100 may be sequentially stacked on the first injection plate 800 such that the resin material may flow through the first runner 110 into the upper mold 100, pass through the first gate 120, and flow into the first molding 410 formed in the first intermediate plate 400, to mold at least a portion on the first substrate 10.

Accordingly, using the stack molding machine in which the lower mold 200-1, the third substrate 30, the third intermediate plate 600, the second injection plate 900, the second substrate 20, the second intermediate plate 500, the first injection plate 800, the first substrate 10, the first intermediate plate 400, and the upper mold 100 are sequentially stacked on one another, the portions on the first, second, and third substrates 10, 20, and 30 may be molded at once.

Thicknesses of the first, second, and third moldings 410, 510, and 610 are determined by thicknesses of the first, second, and third intermediate plates 400, 500, and 600, respectively.

As illustrated in FIG. 3, the stack molding machine of the present invention may further include the injection mold 300 provided between the upper and lower molds 100 and 200-1 and having formed therein an injection port 380 including a first port 381 to inject the resin material into the first, second, and third moldings 410, 510, and 610.

In this case, the first port 381 may be used to mold all moldings of layers including stacked substrates, and molding may be enabled without increasing the number of ports even when the number of substrates is increased.

The injection mold 300 may include the first connector 310, a third connector 330, and a fourth connector 340.

The fourth connector 340 may connect the first port 381 to the fourth runner 910 to inject the resin material from the first port 381 into the third molding 610.

For example, as illustrated in FIG. 4, the third intermediate plate 600 may have formed therein a plurality of third moldings 610-1, 610-2, and 610-3, and the second injection plate 900 may have formed therein a plurality of fourth gates 920-1, 920-2, and 920-3 and a plurality of fourth runners 910-1, 910-2, and 910-3 separately connected to the plurality of third moldings 610-1, 610-2, and 610-3.

As such, the injection mold 300 may have formed therein a plurality of fourth connectors 340-1, 340-2, and 340-3 separately connected to the plurality of fourth runners 910-1, 910-2, and 910-3 to inject the resin material therethrough.

The third connector 330 may connect the first port 381 to the third runner 810 to inject the resin material from the first port 381 into the second molding 510.

For example, as illustrated in FIG. 5, the second intermediate plate 500 may have formed therein a plurality of second moldings 510-1, 510-2, and 510-3, and the first injection plate 800 may have formed therein a plurality of third gates 820-1, 820-2, and 820-3 and a plurality of third runners 810-1, 810-2, and 810-3 separately connected to the plurality of second moldings 510-1, 510-2, and 510-3.

As such, the injection mold 300 may have formed therein a plurality of third connectors 330-1, 330-2, and 330-3 separately connected to the plurality of third runners 810-1, 810-2, and 810-3 to inject the resin material therethrough.

The first connector 310 may connect the first port 381 to the first runner 110 to inject the resin material from the first port 381 into the first molding 410.

For example, as illustrated in FIG. 6, the first intermediate plate 400 may have formed therein a plurality of first moldings 410-1, 410-2, and 410-3, and the upper mold 100 may have formed therein a plurality of first gates 120-1, 120-2, and 120-3 and a plurality of first runners 110-1, 110-2, and 110-3 separately connected to the plurality of first moldings 410-1, 410-2, and 410-3.

As such, the injection mold 300 may have formed therein a plurality of first connectors 310-1, 310-2, and 310-3 separately connected to the plurality of first runners 110-1, 110-2, and 110-3 to inject the resin material therethrough.

That is, as illustrated in FIGS. 3 to 6, the injection mold 300 may include the injection port 380 provided as the first port 381, and the resin material may flow into the first port 381 and be injected through the plurality of first connectors 310-1, 310-2, and 310-3, the plurality of third connectors 330-1, 330-2, and 330-3, and the plurality of fourth connectors 340-1, 340-2, and 340-3 into the plurality of first moldings 410-1, 410-2, and 410-3, the plurality of second moldings 510-1, 510-2, and 510-3, and the plurality of third moldings 610-1, 610-2, and 610-3 to mold at least portions of the first, second, and third substrates 10, 20, and 30.

Although not shown in the drawings, a larger number of substrates may be stacked and molded based on the numbers of intermediate plates and injection plates.

Figure 7:
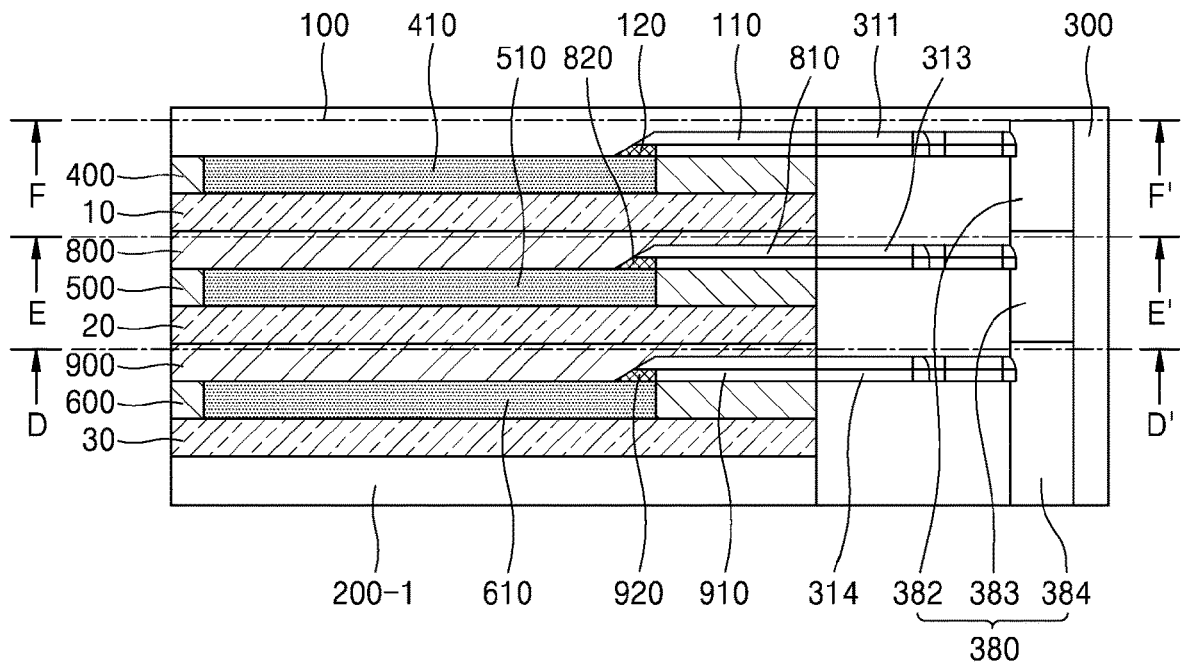
FIG. 7 is a cross-sectional view of a stack molding machine according to still another embodiment of the present invention.
Figure 8:
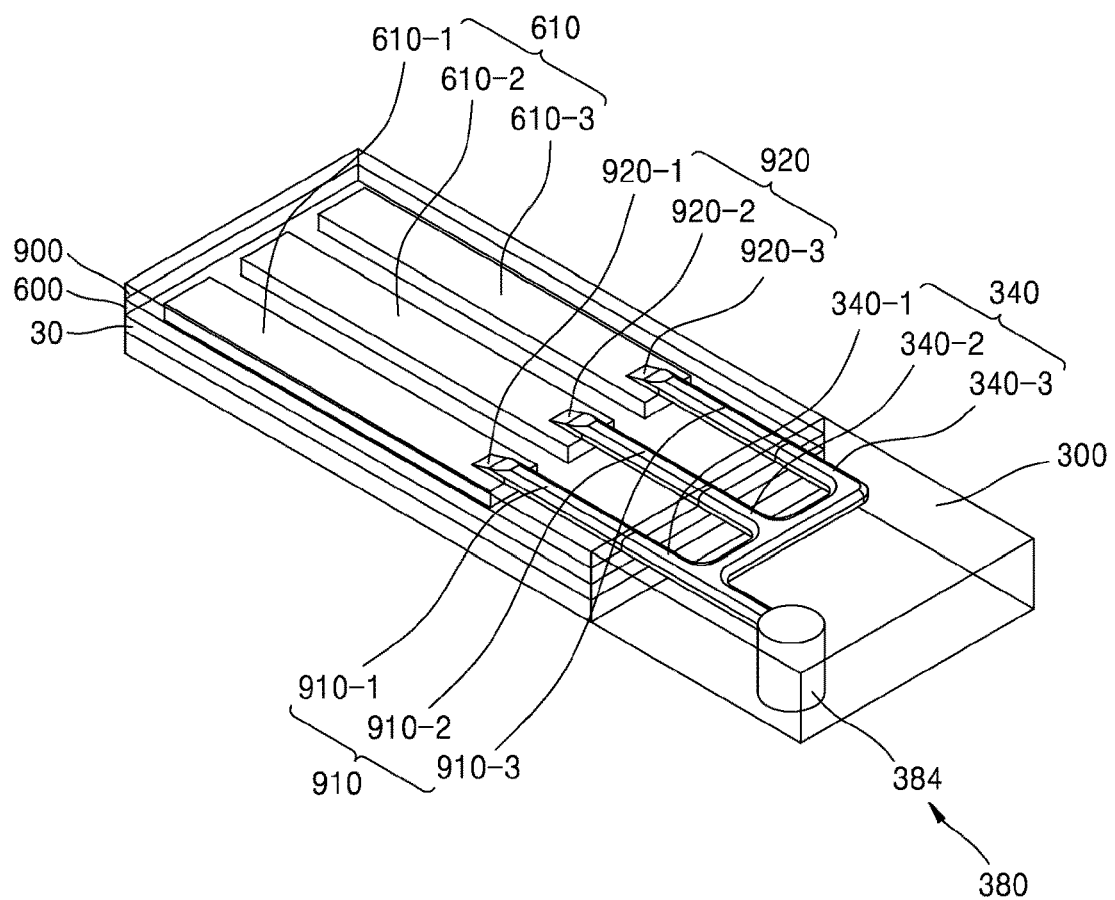
FIG. 8 is a perspective view showing a D-D' cross-section of FIG. 7.
Figure 9:
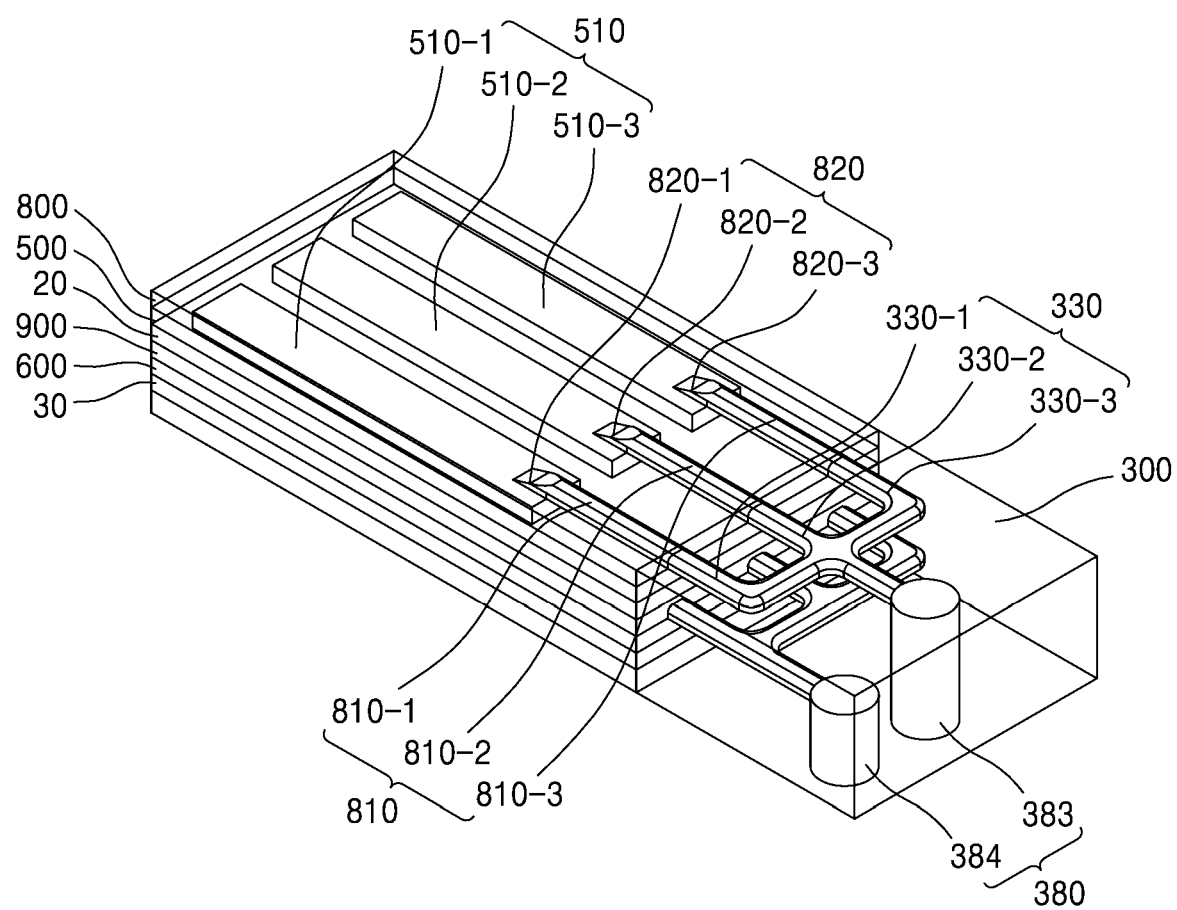
FIG. 9 is a perspective view showing an E-E' cross-section of FIG. 7.
Figure 10:
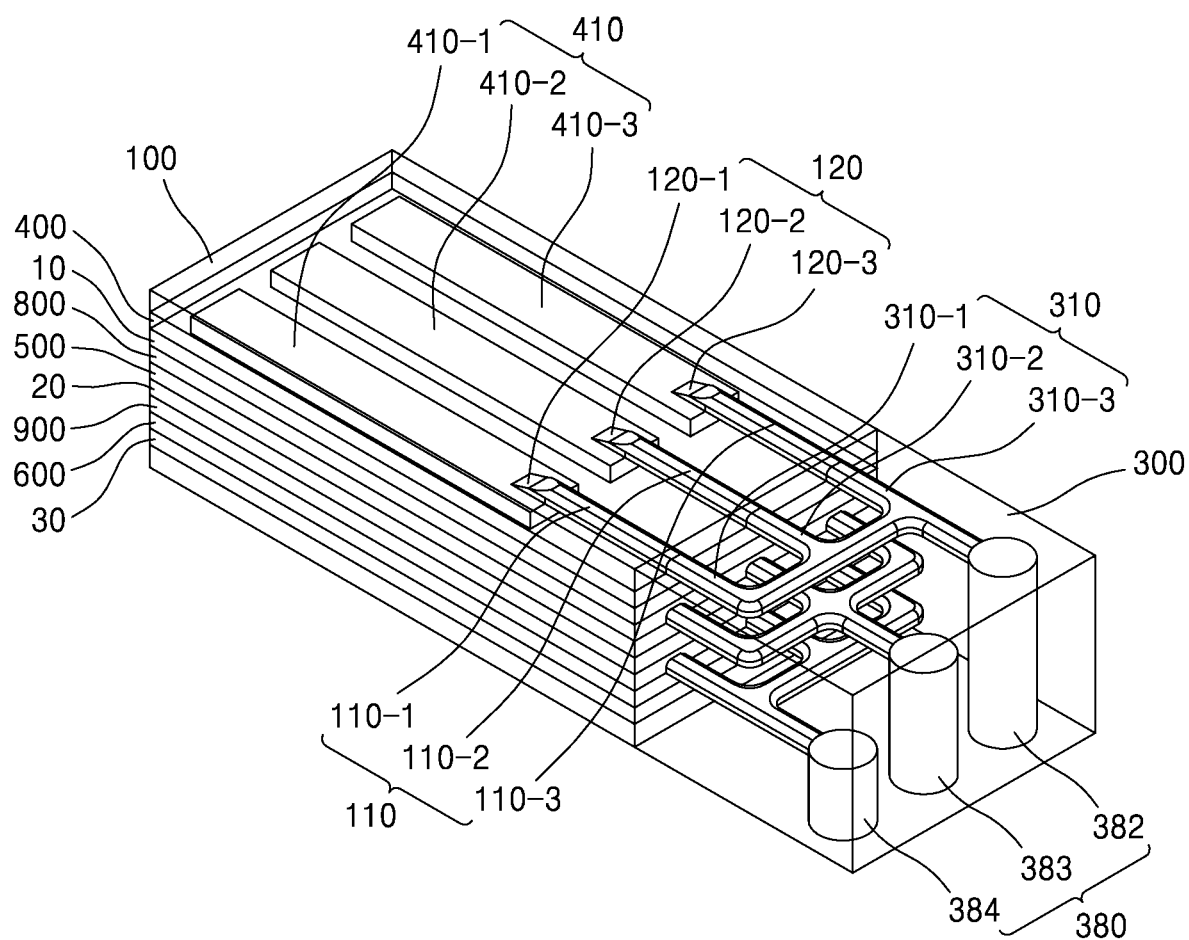
FIG. 10 is a perspective view showing an F-F' cross-section of FIG. 7.

FIG. 7 is a cross-sectional view of a stack molding machine according to still another embodiment of the present invention, and FIGS. 8, 9, and 10 are perspective views showing D-D', E-E', and F-F' cross-sections of FIG. 7.

The stack molding machine according to still another embodiment of the present invention may include the upper and lower molds 100 and 200-1, the first, second, and third intermediate plates 400, 500, and 600, the first and second injection plates 800 and 900, and the injection mold 300.

In this case, the upper and lower molds 100 and 200-1, the first, second, and third intermediate plates 400, 500, and 600, and the first and second injection plates 800 and 900 are the same in configuration and purpose as those described above.

As illustrated in FIG. 7, the injection mold 300 may be provided between the upper and lower molds 100 and 200-1, and have formed therein the injection port 380 including a second port 382, a third port 383, and a fourth port 384 to inject the resin material into the first, second, and third moldings 410, 510, and 610, respectively.

In this case, the second, third, and fourth ports 382, 383, and 384 may have different heights depending on a layer including each substrate, and one port may be used to mold all moldings of one layer.

Specifically, the first connector 310 may connect the second port 382 to the first runner 110 to inject the resin material into the first molding 410, the third connector 330 may connect the third port 383 to the third runner 810 to inject the resin material into the second molding 510, and the fourth connector 340 may connect the fourth port 384 to the fourth runner 910 to inject the resin material into the third molding 610.

For example, as illustrated in FIG. 8, the third intermediate plate 600 may have formed therein the plurality of third moldings 610-1, 610-2, and 610-3, and the second injection plate 900 may have formed therein the plurality of fourth gates 920-1, 920-2, and 920-3 and the plurality of fourth runners 910-1, 910-2, and 910-3 separately connected to the plurality of third moldings 610-1, 610-2, and 610-3.

In this case, the injection mold 300 may have formed therein the plurality of fourth connectors 340-1, 340-2, and 340-3 separately connected to the plurality of fourth runners 910-1, 910-2, and 910-3, and the plurality of fourth connectors 340-1, 340-2, and 340-3 may be connected to the fourth port 384 such that the resin material may flow through the fourth port 384 into the plurality of third moldings 610-1, 610-2, and 610-3.

As illustrated in FIG. 9, the second intermediate plate 500 may have formed therein the plurality of second moldings 510-1, 510-2, and 510-3, and the first injection plate 800 may have formed therein the plurality of third gates 820-1, 820-2, and 820-3 and the plurality of third runners 810-1, 810-2, and 810-3 separately connected to the plurality of second moldings 510-1, 510-2, and 510-3.

In this case, the injection mold 300 may have formed therein the plurality of third connectors 330-1, 330-2, and 330-3 separately connected to the plurality of third runners 810-1, 810-2, and 810-3, and the plurality of third connectors 330-1, 330-2, and 330-3 may be connected to the third port 383 such that the resin material may flow through the third port 383 into the plurality of second moldings 510-1, 510-2, and 510-3.

As illustrated in FIG. 10, the first intermediate plate 400 may have formed therein the plurality of first moldings 410-1, 410-2, and 410-3, and the upper mold 100 may have formed therein the plurality of first gates 120-1, 120-2, and 120-3 and the plurality of first runners 110-1, 110-2, and 110-3 separately connected to the plurality of first moldings 410-1, 410-2, and 410-3.

In this case, the injection mold 300 may have formed therein the plurality of first connectors 310-1, 310-2, and 310-3 separately connected to the plurality of first runners 110-1, 110-2, and 110-3, and the plurality of first connectors 310-1, 310-2, and 310-3 may be connected to the second port 382 such that the resin material may flow through the second port 382 into the plurality of first moldings 410-1, 410-2, and 410-3.

Specifically, as illustrated in FIGS. 7 to 10, the resin material flowing into the second port 382 may pass through the first connector 310 and be injected into the first molding 410 to mold at least a portion of the first substrate 10.

The resin material flowing into the third port 383 may pass through the third connector 330 and be injected into the second molding 510 to mold at least a portion of the second substrate 20, and the resin material flowing into the fourth port 384 may pass through the fourth connector 340 and be injected into the third molding 610 to mold at least a portion of the third substrate 30.

That is, different resin materials may be injected into the first, second, and third substrates 10, 20, and 30 through the injection port 380 including the second, third, and fourth ports 382, 383, and 384, and the first, second, and third substrates 10, 20, and 30 may be molded in different-shaped patterns based on shapes of the first, second, and third moldings 410, 510, and 610.

In addition, an injection time may be shortened by injecting the resin material separately into the second, third, and fourth ports 382, 383, and 384.

Figure 11:
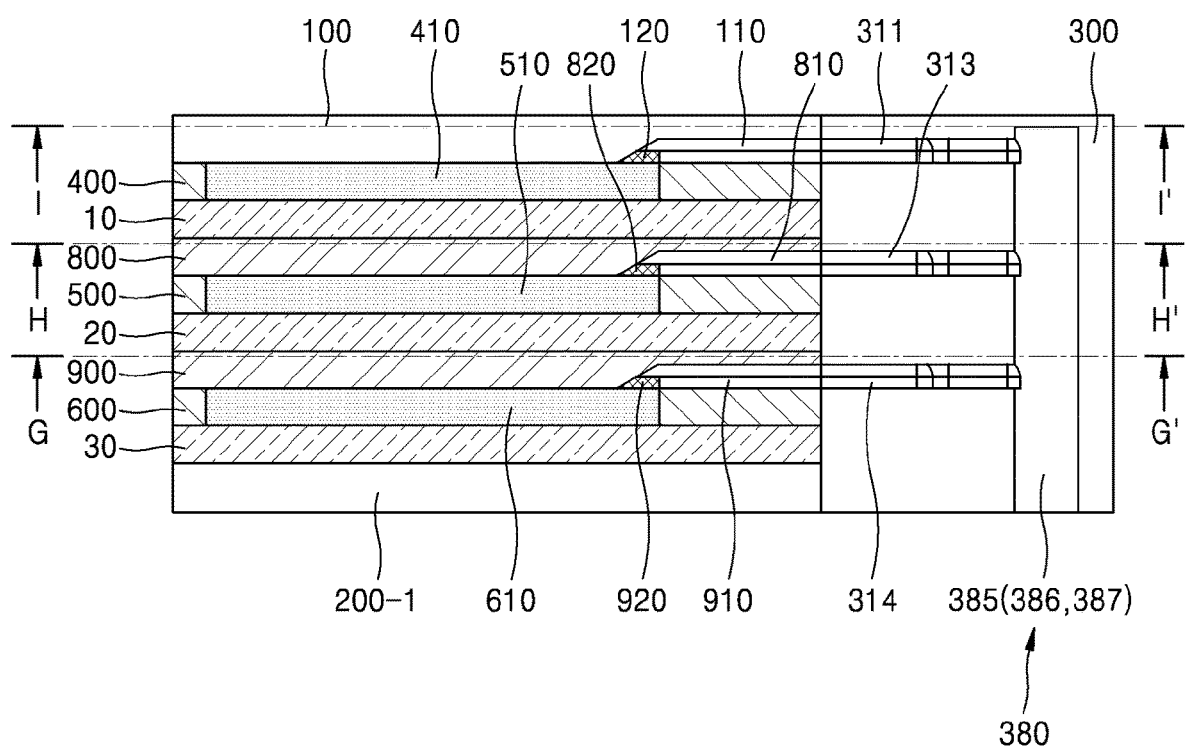
FIG. 11 is a cross-sectional view of a stack molding machine according to still another embodiment of the present invention.
Figure 12:
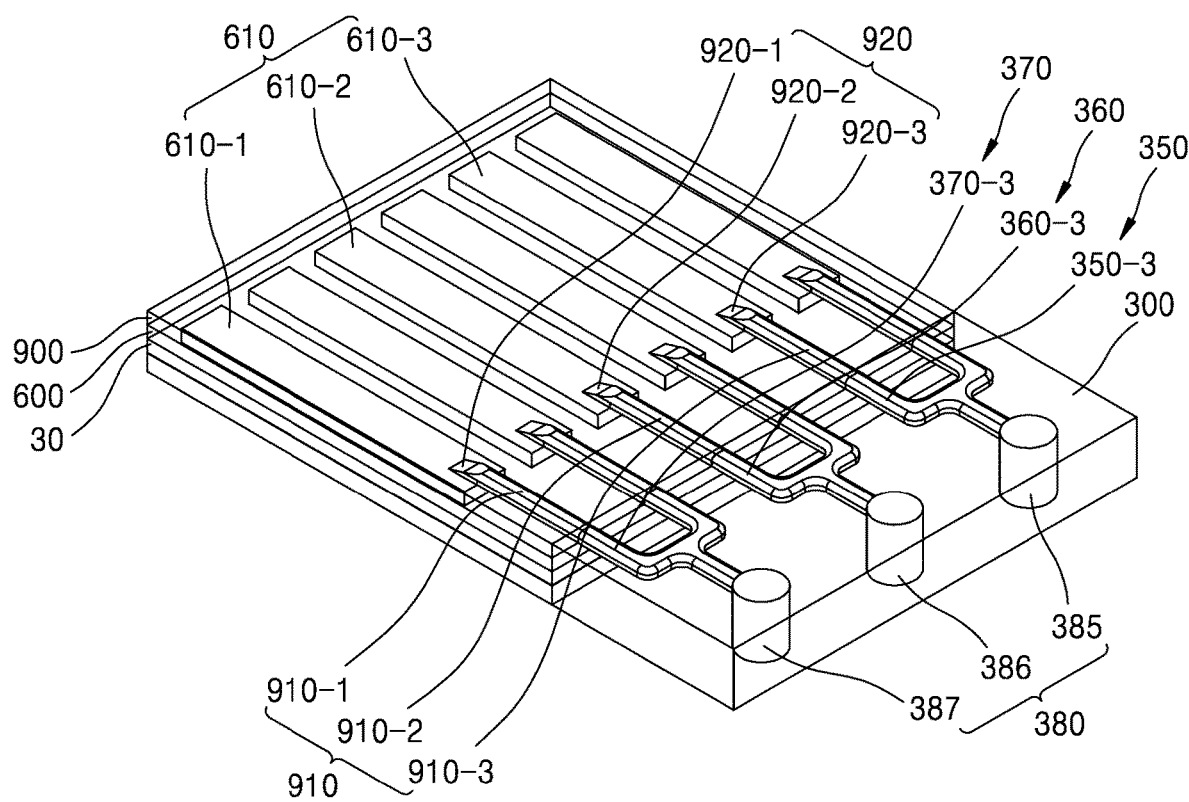
FIG. 12 is a perspective view showing a G-G' cross-section of FIG. 11.
Figure 13:
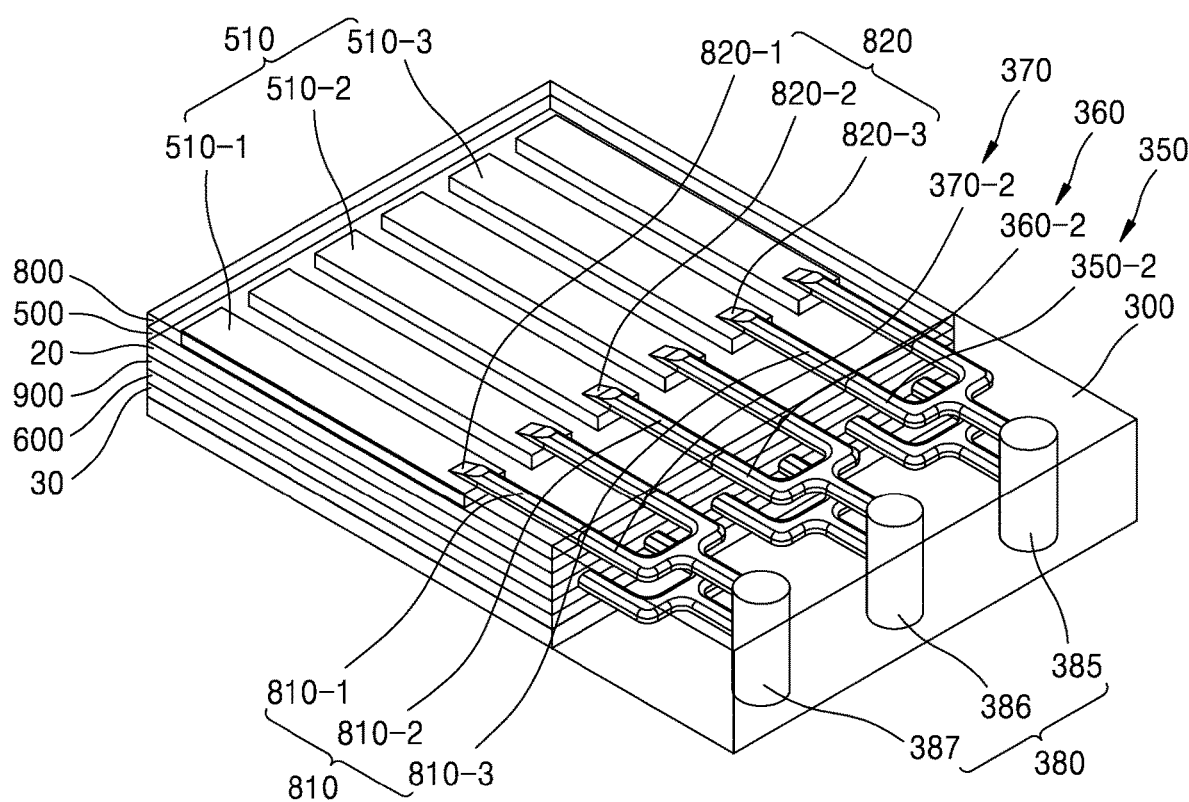
FIG. 13 is a perspective view showing an H-H' cross-section of FIG. 11.
Figure 14:
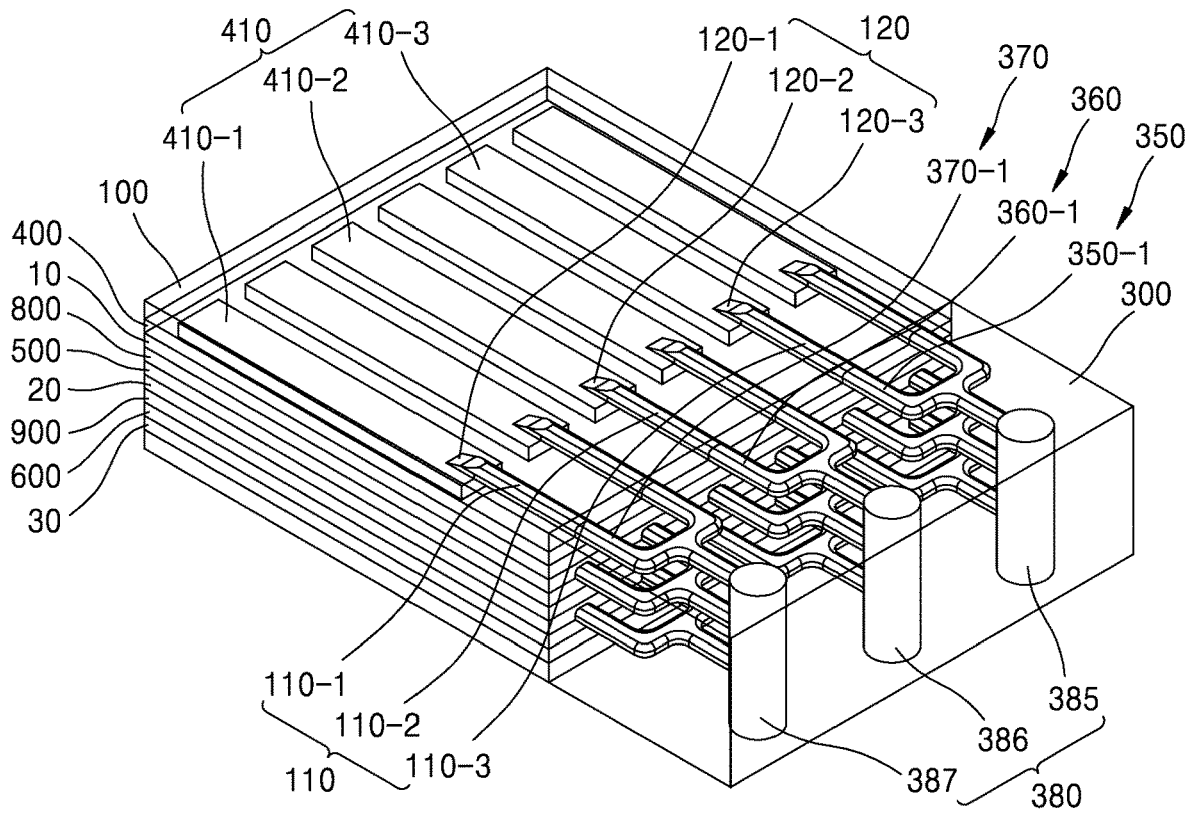
FIG. 14 is a perspective view showing an I-I' cross-section of FIG. 11.

FIG. 11 is a cross-sectional view of a stack molding machine according to still another embodiment of the present invention, and FIGS. 12, 13, and 14 are perspective views showing G-G', H-H', and I-I' cross-sections of FIG. 11.

The stack molding machine according to still another embodiment of the present invention may include the upper and lower molds 100 and 200-1, the first, second, and third intermediate plates 400, 500, and 600, the first and second injection plates 800 and 900, and the injection mold 300.

In this case, the upper and lower molds 100 and 200-1, the first, second, and third intermediate plates 400, 500, and 600, and the first and second injection plates 800 and 900 are the same in configuration and purpose as those described above.

As illustrated in FIG. 11, the injection mold 300 may be provided between the upper and lower molds 100 and 200-1, and have formed therein the injection port 380 including a fifth port 385, a sixth port 386, and a seventh port 387 to inject the resin material into a plurality of first moldings 410, a plurality of second moldings 510, and a plurality of third moldings 610, respectively.

In this case, the fifth, sixth, and seventh ports 385, 386, and 387 may be used to mold designated moldings of layers including stacked substrates.

A fifth connector 350 may connect the fifth port 385 commonly to one of the plurality of first runners 110-1, 110-2, and 110-3, one of the plurality of third runners 810-1, 810-2, and 810-3, and one of the plurality of fourth runners 910-1, 910-2, and 910-3.

A sixth connector 360 may connect the sixth port 386 commonly to another of the plurality of first runners 110-1, 110-2, and 110-3, another of the plurality of third runners 810-1, 810-2, and 810-3, and another of the plurality of fourth runners 910-1, 910-2, and 910-3.

A seventh connector 370 may connect the seventh port 387 commonly to still another of the plurality of first runners 110-1, 110-2, and 110-3, still another of the plurality of third runners 810-1, 810-2, and 810-3, and still another of the plurality of fourth runners 910-1, 910-2, and 910-3.

For example, as illustrated in FIGS. 12 to 14, the plurality of third moldings 610-1, 610-2, and 610-3 may be provided on the third substrate 30, the plurality of second moldings 510-1, 510-2, and 510-3 may be provided on the second substrate 20, and the plurality of first moldings 410-1, 410-2, and 410-3 may be provided on the first substrate 10.

In this case, from among a plurality of fifth connectors 350-1, 350-2, and 350-3, the fifth port 385 may be connected to one first runner 110-3 through the fifth connector 350-1, connected to one third runner 810-3 through the fifth connector 350-2, and connected to one fourth runner 910-3 through the fifth connector 350-3.

From among a plurality of sixth connectors 360-1, 360-2, and 360-3, the sixth port 386 may be connected to one first runner 110-2 through the sixth connector 360-1, connected to one third runner 810-2 through the sixth connector 360-2, and connected to one fourth runner 910-2 through the sixth connector 360-3.

From among a plurality of seventh connectors 370-1, 370-2, and 370-3, the sixth port 386 may be connected to one first runner 110-1 through the seventh connector 370-1, connected to one third runner 810-1 through the seventh connector 370-2, and connected to one fourth runner 910-1 through the seventh connector 370-3.

Accordingly, because the fifth, sixth, and seventh ports 385, 386, and 387 may be used to mold designated moldings of each layer, molding may be enabled without increasing the number of ports even when the number of substrates is increased, and all ports may have the same height to equally form all moldings.

In addition, different resin materials may be injected onto the first, second, and third substrates 10, 20, and 30 through the injection port 380 including the fifth, sixth, and seventh ports 385, 386, and 387, and different regions on each substrate may be molded in different-shaped patterns based on shapes of the plurality of first moldings 410, the plurality of second moldings 510, and the plurality of third moldings 610, thereby molding different-shaped patterns within each substrate in large quantities.

Although a machine for molding the first, second, and third substrates 10, 20, and 30 is provided according to various embodiments of the present invention, the same configuration may be provided in a plural number to mold a larger number of substrates or mold a variety of patterns within each substrate in large quantities.

Figure 15:
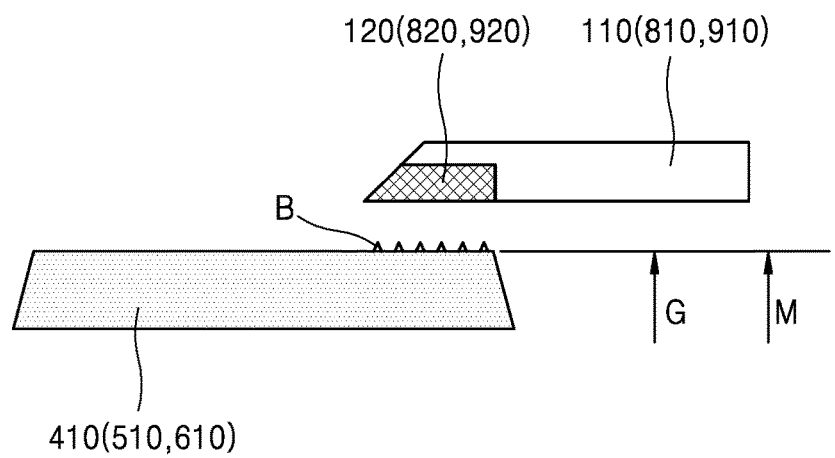
FIGS. 15 to 17 are cross-sectional views showing forms of a residue according to various embodiments of the present invention.
Figure 16:
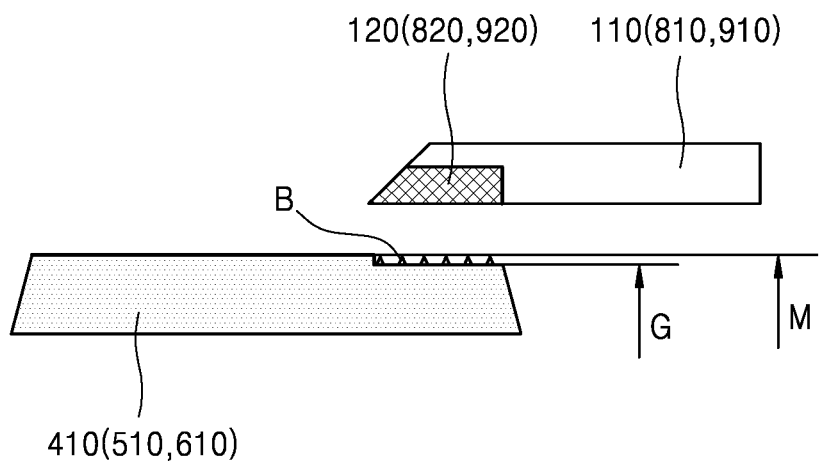
Figure 17:
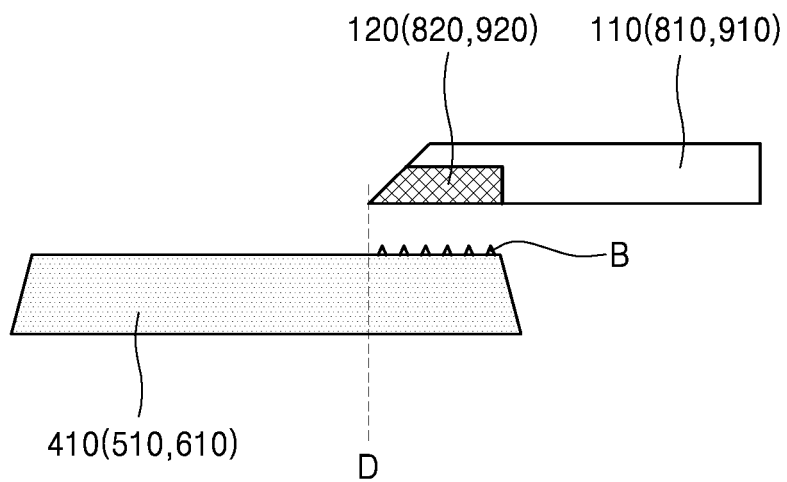

FIGS. 15 to 17 are cross-sectional views showing forms of a residue B according to various embodiments of the present invention.

As illustrated in FIG. 15, when the first runner 110 and the first gate 120 are removed from the resin material cured in the first molding 410, a burr which is the residue B of the resin material may remain.

In this case, a lowermost portion G of the first gate 120 which is an end portion of the first runner 110 may be bonded to an upper surface of the first molding 410, and have a height equal to that of an uppermost portion M of the first molding 410.

Accordingly, the residue B caused after the first gate 120 is removed remains on the uppermost portion M of the first molding 410, and may be removed through a post-process.

Likewise, lowermost portions G of the third and fourth gates 820 and 920 may have the same heights as uppermost portions M of the second and third moldings 510 and 610.

As illustrated in FIG. 16, the lowermost portion G of the first gate 120 which is an end portion of the first runner 110 may be bonded to a recess in the upper surface of the first molding 410, and have a height less than that of the uppermost portion M of the first molding 410.

Accordingly, the residue B caused after the first gate 120 is removed remains below the uppermost portion M of the first molding 410, i.e., does not exceed a height of a molded substrate package, and may be removed through a post-process.

As illustrated in FIG. 17, the lowermost portion G of the first gate 120 which is an end portion of the first runner 110 may be bonded to the upper surface of the first molding 410, and have a height equal to that of the uppermost portion M of the first molding 410.

In this case, as indicated by "D" of FIG. 17, the first molding 410 may have a size greater than a product size and the residue B caused when the first gate 120 is removed may be removed together with a portion of the first molding 410.

Figure 18:
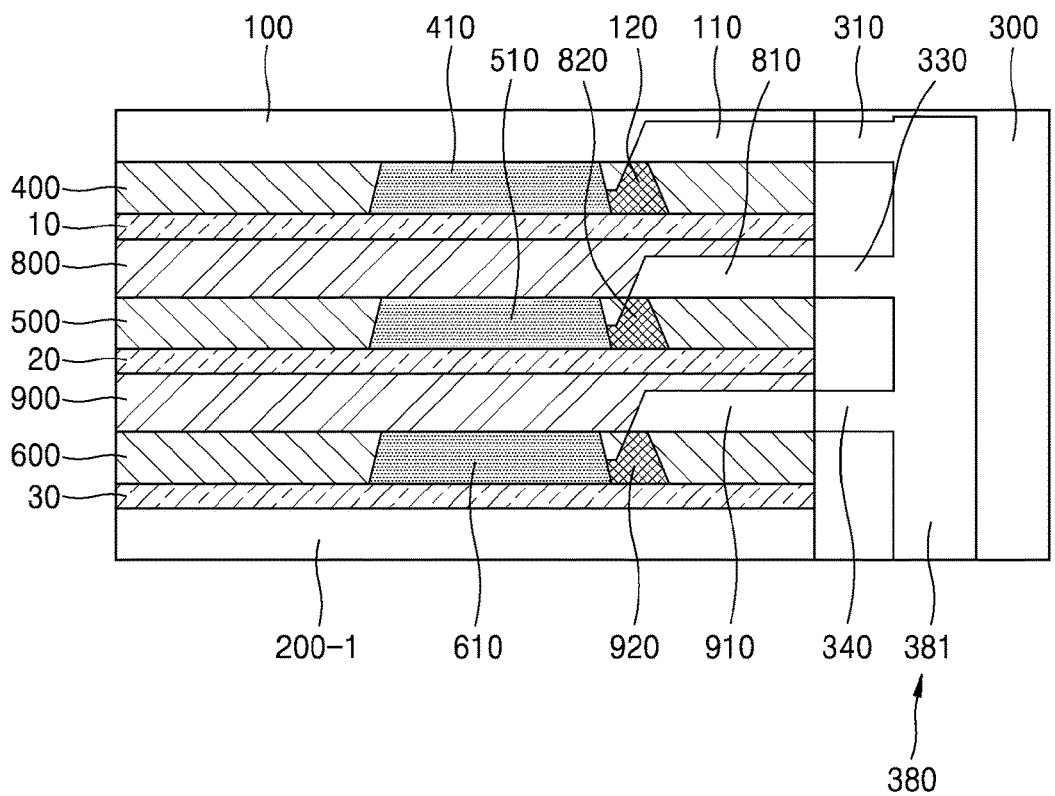
FIG. 18 is a cross-sectional view of a stack molding machine according to still another embodiment of the present invention.

FIG. 18 is a cross-sectional view of a stack molding machine according to still another embodiment of the present invention.

The stack molding machine according to still another embodiment of the present invention may include the upper and lower molds 100 and 200-1, the first, second, and third intermediate plates 400, 500, and 600, the first and second injection plates 800 and 900, and the injection mold 300.

In this case, the upper and lower molds 100 and 200-1 are the same in configuration and purpose as those described above.

The upper mold 100 may have formed therein the first runner 110 serving as a path of the resin material, and the first intermediate plate 400 may be provided under the upper mold 100 and have formed therein the first gate 120 for connecting the first runner 110 to the first molding 410.

That is, because the first gate 120 to be removed from the first molding 410 is formed in the first intermediate plate 400, after the resin material is molded on the first substrate 10 and then the upper and lower molds 100 and 200-1 and the injection mold 300 are open, the first gate 120 may be removed through a post-process such as degating.

Likewise, the second intermediate plate 500 may have formed therein the third gate 820 for connecting the third runner 810 formed in the first injection plate 800, to the second molding 510, and the third intermediate plate 600 may have formed therein the fourth gate 920 for connecting the fourth runner 910 formed in the second injection plate 900, to the third molding 610.

Figure 19:
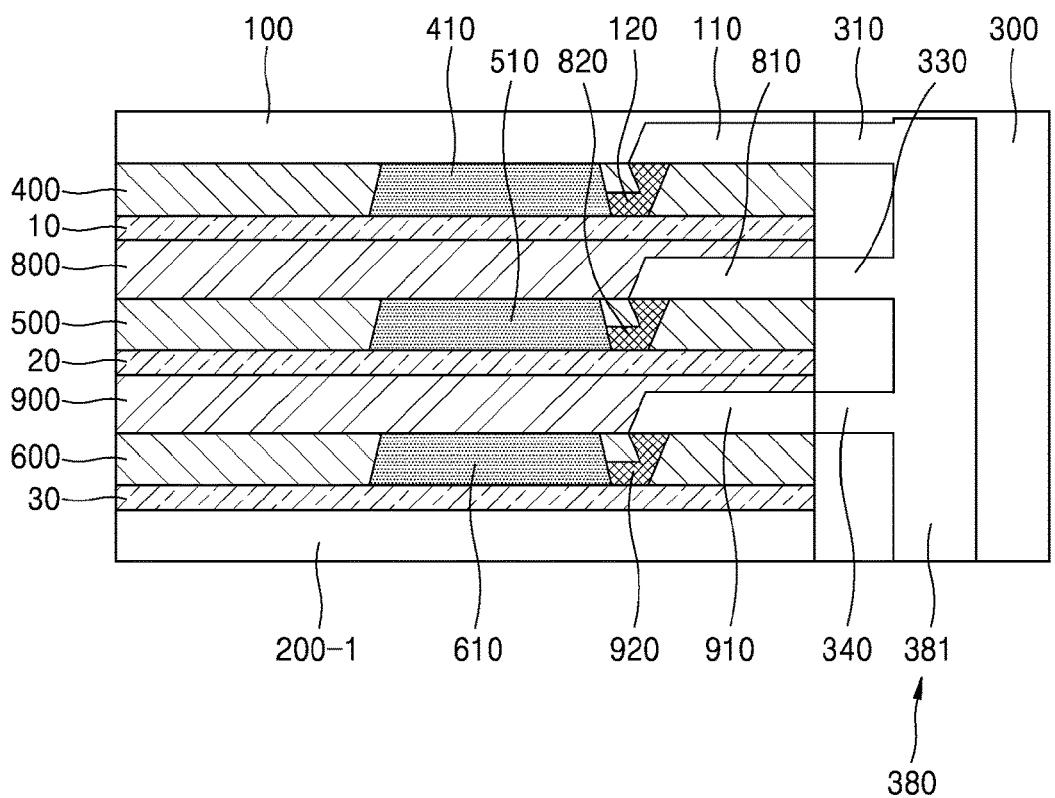
FIGS. 19 and 20 are cross-sectional views showing shapes of gates according to various embodiments of the present invention.
Figure 20:
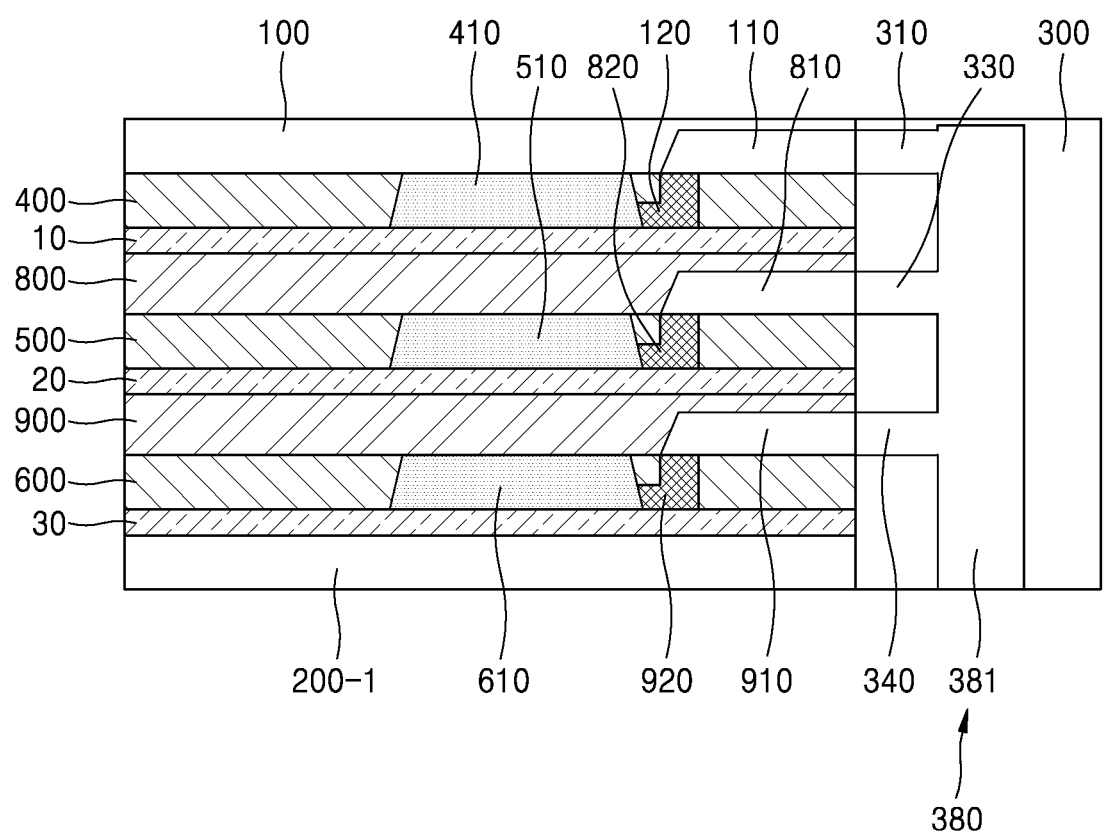

In this case, the first, third, and fourth gates 120, 820, and 920 may be formed in a trapezoidal shape as illustrated in FIG. 18, in an inverted trapezoidal shape as illustrated in FIG. 19, or in a rectangular shape as illustrated in FIG. 20.

Although not shown in the drawings, the first, third, and fourth gates 120, 820, and 920 may be provided in various shapes and forms, or provided in different shapes.

The first, second, and third substrates 10, 20, and 30 and the above-described substrates may include all moldable boards, e.g., printed circuit boards (PCBs), flexible printed circuit boards (FPCBs), lead frames, rigid flexible printed circuit boards (RFPCBs), rigid PCBs, ceramic boards, and glass boards.

According to various embodiments of the present invention, a plurality of substrates may be molded through a single molding process by stacking the substrates on one another, and molding may be controlled per layer by using a plurality of injection ports.

According to the above-described structure, a thickness of moldings on the substrates may be adjusted by controlling the thickness applied to intermediate plates, mass production may be enabled, production efficiency may be greatly increased due to a reduction in production time, a plurality of substrates may be molded through a single molding process, and production costs may be reduced by reducing a resin material to be removed.

According to the afore-described embodiments of the present invention, a stack molding machine capable of molding a plurality of substrates through a single molding process by stacking the substrates on one another, of reducing damage of moldings on the substrates when demolded, of controlling molding per layer by using a plurality of injection ports, of adjusting a thickness of the moldings on the substrates by controlling the thickness applied to intermediate plates, of enabling mass production, of greatly increasing production efficiency due to a reduction in production time, of molding a plurality of substrates through a single molding process, and of reducing production costs by reducing a resin material to be removed may be provided. However, the scope of the present invention is not limited to the above-described effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A stack molding machine comprising:
    an upper mold having formed therein a first runner serving as a path of a resin material;
    a first intermediate plate provided under and combined with the upper mold, and having formed therein a first molding connected to the first runner to mold at least a portion on a first substrate placed under the first intermediate plate;
    a first injection plate provided under the first intermediate plate, and having formed therein a third runner serving as a path of the resin material;
    a second intermediate plate provided under the first injection plate, and having formed therein a second molding connected to the third runner to mold at least a portion on a second substrate placed under the second intermediate plate;
    a second injection plate provided under the second intermediate plate, and having formed therein a fourth runner serving as a path of the resin material;
    a third intermediate plate provided under the second injection plate, and having formed therein a third molding connected to the fourth runner to mold at least a portion on a third substrate placed under the third intermediate plate; and
    a lower mold provided under and combined with the third intermediate plate,
    wherein the upper mold comprises a first gate connected to the first molding at an end of the first runner,
    wherein the first injection plate comprises a third gate connected to the second molding at an end of the third runner, and
    wherein the second injection plate comprises a fourth gate connected to the third molding at an end of the fourth runner.

2. The stack molding machine of claim 1, further comprising an injection mold provided between the upper and lower molds, and having formed therein an injection port comprising a first port to inject the resin material into the first, second, and third moldings,
    wherein the injection mold comprises:
        a first connector for connecting the first port to the first runner to inject the resin material into the first molding;
        a third connector for connecting the first port to the third runner to inject the resin material into the second molding; and
        a fourth connector for connecting the first port to the fourth runner to inject the resin material into the third molding.

3. The stack molding machine of claim 1, further comprising an injection mold provided between the upper and lower molds, and having formed therein an injection port comprising a second port, a third port, and a fourth port to inject the resin material into the first, second, and third moldings, respectively,
    wherein the injection mold comprises:
        a first connector for connecting the second port to the first runner to inject the resin material into the first molding;
        a third connector for connecting the third port to the third runner to inject the resin material into the second molding; and
        a fourth connector for connecting the fourth port to the fourth runner to inject the resin material into the third molding.

4. The stack molding machine of claim 1, further comprising an injection mold provided between the upper and lower molds, and having formed therein an injection port comprising a fifth port, a sixth port, and a seventh port to inject the resin material into a plurality of first moldings, a plurality of second moldings, and a plurality of third moldings, respectively, through a plurality of first runners, a plurality of third runners, and a plurality of fourth runners, respectively,
    wherein the injection mold comprises:
        a plurality of fifth connectors, each fifth connector connecting the fifth port commonly to a corresponding first runner, a corresponding third runner, and a corresponding fourth runner, respectively;
        a plurality of sixth connectors, each sixth connector connecting the sixth port commonly to another corresponding first runner, another corresponding third runner, and another corresponding fourth runner, respectively; and
        a plurality of seventh connectors, each seventh connector connecting the seventh port commonly to still another corresponding first runner, still another corresponding third runner, and still another corresponding fourth runner, respectively.

5. The stack molding machine of claim 1, wherein lowermost portions of the first, third, and fourth gates have heights equal to those of uppermost portions of the first, second, and third moldings, respectively, in such a manner that residues caused after the first, third, and fourth gates are removed from the first, second, and third moldings remain on the uppermost portions of the first, second, and third moldings, respectively.

6. The stack molding machine of claim 1, wherein lowermost portions of the first, third, and fourth gates have heights less than those of uppermost portions of the first, second, and third moldings, respectively, in such a manner that residues caused after the first, third, and fourth gates are removed from the first, second, and third moldings remain below the uppermost portions of the first, second, and third moldings, respectively.

7. The stack molding machine of claim 1, wherein the first, third, and fourth gates have a trapezoidal shape, an inverted trapezoidal shape, or a rectangular shape.

* * * * *